United States Patent [19]

Alt et al.

[11] 4,169,191

[45] Sep. 25, 1979

[54] BATTERY CLAMPING AND RETENTION

[75] Inventors: Robert D. Alt, Warren; Alverson B. Williams, Sterling Heights; Edward L. Pauly, Imlay City, all of Mich.

[73] Assignee: General Motors Corporation, Detroit, Mich.

[21] Appl. No.: 941,273

[22] Filed: Sep. 11, 1978

[51] Int. Cl.² .................................... H01M 2/10
[52] U.S. Cl. ........................... 429/99; 180/68.5
[58] Field of Search .............. 429/99, 100; 180/68.5

[56] References Cited
U.S. PATENT DOCUMENTS

| | | | |
|---|---|---|---|
| 1,716,610 | 6/1929 | Wilson et al. | 429/99 |
| 2,939,901 | 6/1960 | Schultz | 429/100 |
| 3,199,624 | 8/1965 | Burns et al. | 180/68.5 |
| 4,109,064 | 8/1978 | Warner et al. | 429/99 |

*Primary Examiner*—Donald L. Walton
*Attorney, Agent, or Firm*—R. L. Phillips

[57] ABSTRACT

A low-profile and versatile battery-retaining assembly used to secure a plurality of batteries for an electric vehicle. The batteries are arranged in close proximity to one another in a generally rectangular matrix of two or more and each has recessed hold-down portions located on opposite lower edges. A perimeter frame extends about the battery arrangement and includes vertical and horizontal edge portions. Elongated retainer members extend between the batteries, each having enlarged portions which project into the recessed hold-down portions of the batteries. The elongated retainer members engage the frame with their ends extending into elongated slots which permits self adjustment with respect to the position relative the frame ends. This automatically accommodates variations in battery dimension.

2 Claims, 3 Drawing Figures

BATTERY CLAMPING AND RETENTION

This invention relates to a retainer assembly for a plurality of batteries which are arranged in a matrix of two or more in side-by-side relation.

Electric vehicles of the furture will most likely utilize a plurality of batteries. These batteries are somewhat bulky and also must be tightly secured in the vehicle to prevent shifting. The present invention provides a low profile and inexpensive battery-retaining assembly having means to permit close side-by-side positioning. Automatically adjustable retaining means are located between the batteries for vertical retention. The automatic adjustment is needed because the dimensions of battery cases vary considerably and when several batteries are in side-by-side relation, the net dimensional change is considerable.

The present invention provides a perimeter frame with both vertical and horizontal portions to retain the batteries and support them at their edges. The batteries include recessed hold-down portions formed in opposite edges. Elongated retainer means extend between the batteries and carry enlarged portions which extend into the hold-down recesses. The ends of the retainer are engaged with the frame within elongated slots to permit sliding movement therein for automatically accommodating the aforesaid dimensional variations inherent when several batteries are placed in side-by-side relationship to one another. The aforedescribed battery retainer is advantageous in that the matrix of batteries may be easily removed from the vehicle as a unit, which is expected to be the common method of charging when electric vehicles come into general use.

Further advantages of the subject battery retainer will be more readily apparent from a reading of the following detailed description, reference being had to the accompanying drawings in which a preferred embodiment is illustrated.

IN THE DRAWINGS

Figure 1:
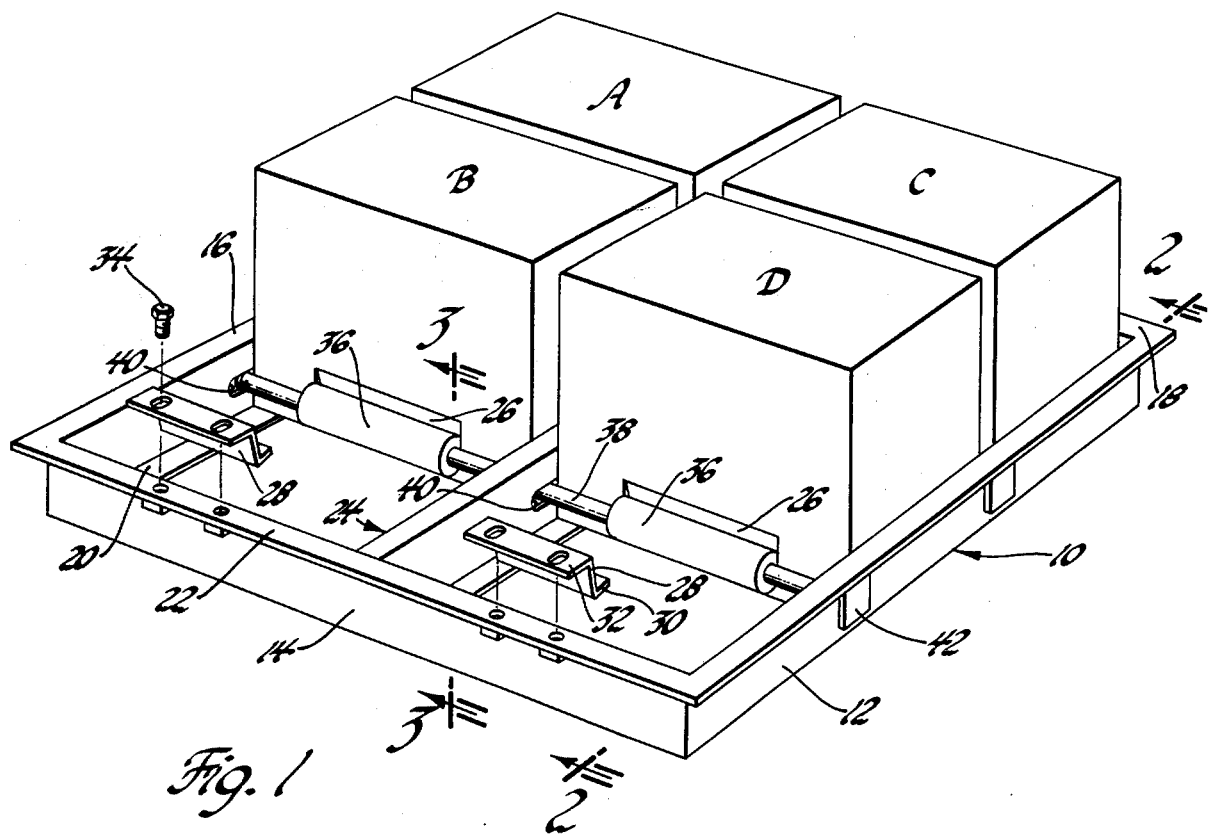
FIG. 1 is a perspective view of a battery-retaining assembly for six batteries but showing only four batteries therein with spaces for the other two batteries so as to better reveal details of the retaining assembly.
Figure 2:
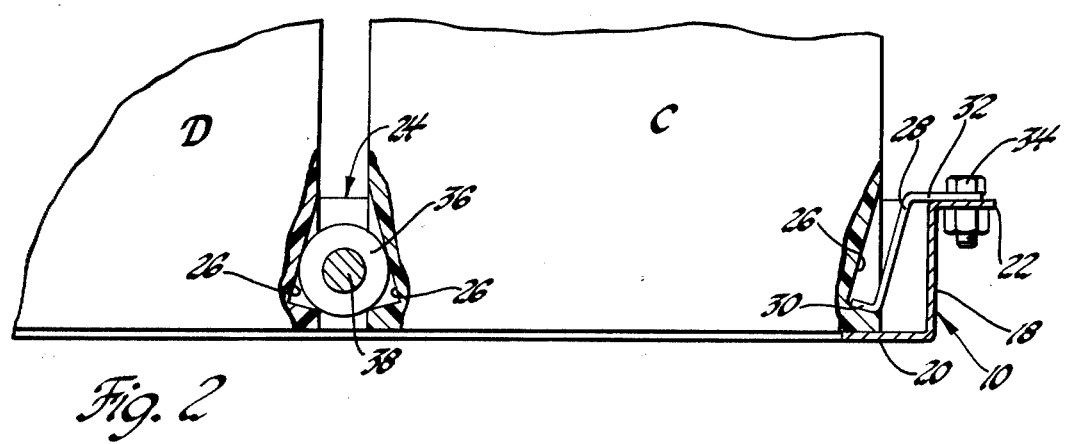
FIG. 2 is a sectioned view taken along section line 2—2 in FIG. 1 and looking in the direction of the arrows.
Figure 3:
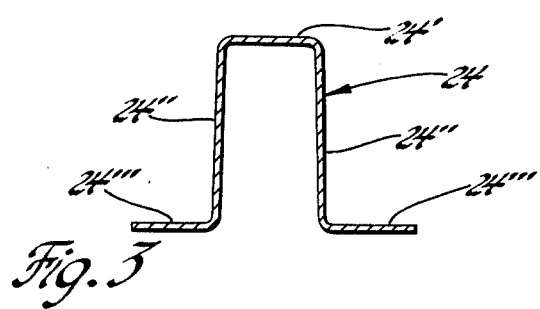

FIG. 3 is a sectioned view taken along section line 3—3 in FIG. 1 and looking in the direction of the arrows. In FIG. 1, four batteries A, B, C and D are illustrated in two rows. The batteries are supported within a perimeter frame 10 which includes four metal sides having the generally Z-shaped cross section best shown in FIG. 2. The sides 12, 14, 16 and 18 are alike and are joined at corner intersections . The sides 12–18 include a vertical midportion and two horizontal portions. The lower horizontal portion 20 extends beneath the edge of the batteries for support. The upper horizontal portion 22 extends around and away from the matrix of batteries and is most advantageously used to support the retaining assembly and batteries within a vehicle.

The retaining assembly 10 also includes a midportion member 24 which extends parallel to sides 12 and 16 and between the rows of batteries A, B and batteries C, D. Member 24 has a generally U-shaped configuration and includes a top surface 24', two vertical portions 24" and lower horizontal flange portions 24'''. Edges of the batteries A–D rest on the horizontal portions 24'''.

It should be noted that within the retainer frame 10, there are two spaces adjacent batteries B and D which are unfilled so that parts of the hold-down mechanism can be better revealed. Specifically, reference is made to FIG. 2 which illustrates the recessed hold-down portions 26 formed along opposite edges of the batteries. These hold-downs include a bottom surface and an inclined side surface. Where the hold-down recessed portions 26 extend adjacent the frame members 12, 14, 16 anf 18, the batteries are vertically retained by clamps 28. The clamps have a lower end portion 30 inwardly extending into the recess and also an outwardly extending horizontal portion 32. Portion 32 is attached to the upper horizontal portion 22 of the retainer assembly 10 by fasteners 34.

Between any two side-by-side batteries, as illustrated in FIG. 2, compact means are provided to retain the batteries. Specifically, an enlarged portion 36 is supported on an elongated retainer member 38 and it extends into the recesses 26. Portion 36 engages both the bottom surface and the inclined side surface thereof. The member 38 extends between opposite sides and across the frame assembly. The ends and the midportion of member 38 extend through elongated openings 40 in members 12, 24 and 16. The elongation of the opening extends in a horizontal direction so as to permit movement of the elongated member 38 in a horizontal plane for accommodating variations between the various side-by-side batteries caused primarily by tolerance variations. Member 38 has enlarged head portions 42 at either end which overlie members 12 and 16 and which move as the ends of member 38 move in the slots 40. It should be pointed out that in FIG. 1, clamps 28 are shown which are adapted to engage recesses 26 in two batteries not shown. The missing batteries are not illustrated so as to better illustrate the frame and retainers.

Although only one embodiment has been illustrated and described in great detail, various modifications are possible without falling outside the scope of the following claims.

The embodiments of an invention in which an exclusive property or privilege is claimed are defined as follows:

1. A compact and low profile battery-retaining assembly for use with a plurality of batteries adapted to be arranged in a matrix with two or more batteries situated in close side-by-side relation and having hold-down portions along their lower edges, comprising:

a perimeter frame extending adjacent the lower edges of the battery matrix, including vertical edge portions and horizontal edge portions which extend under and engage the edges of the battery matrix for support;

elongated spacer and retainer members extending between vertical portions of opposite sides of the perimeter frame and in between the side-by-side situated batteries;

the retainer members having midportions which engage the hold-down portions of the side-by-side situated batteries for horizontal spacing and vertical retention;

means in the vertical portions of the opposite sides receiving the end portions of the retainer members and permitting horizontal movement of the retaining members characterizing a self-adjustment to accommodate variations in battery dimensions.

2. A compact and low profile battery-retaining assembly for use with a plurality of batteries adapted to be arranged in a matrix with two or more batteries situated in close side-by-side relation and having recessed hold-down portions on their lower edge, comprising:

a perimeter frame extending adjacent the lower edges of the battery matrix, including vertical edge portions and horizontal edge portions which extend under and engage the edges of the battery matrix for support;

elongated spacer and retainer members extending between vertical portions of opposite sides of the perimeter frame and in between the side-by-side situated batteries;

the retainer members having enlarged midportions which enter the recessed hold-down portions of the side-by-side situated batteries for horizontal spacing and vertical retention;

means in the vertical portions of the opposite sides including horizontally oriented elongated openings to receive the end portions of the retainer members and permit horizontal movement of the retaining members characterizing a self-adjustment to accommodate variations in battery dimensions.

* * * * *